E. H. STUART & W. A. STUART.

Improvement in Cheese-Vats.

No. 4,416. Reissued June 6, 1871.

Witnesses
John A. Ellis
J. V. White

Inventor's
E. H. & W. A. Stuart,
Per,
T. H. Alexander
Atty

AM. PHOTO-LITHOGRAPHIC CO. N.Y. (OSBORNE'S PROCESS.)

UNITED STATES PATENT OFFICE.

EZRA H. STUART AND WALTER A. STUART, OF CEDARVILLE, NEW YORK.

IMPROVEMENT IN CHEESE-VATS.

Specification forming part of Letters Patent No. 112,090, dated February 21, 1871; reissue No. 4,416, dated June 6, 1871.

*To all whom it may concern:*

Be it known that we, EZRA H. STUART and WALTER A. STUART, of Cedarville, in the county of Herkimer and State of New York, have invented certain new and useful Improvements in Cheese-Vats; and we do hereby declare that the following is a full, clear, and exact description thereof, reference being had to the accompanying drawing and to the letters of reference marked thereon which form a part of this specification.

The special object we have in view is an arrangement of pipes whereby the steam may be shifted from the bottom to the sides of the vat vice versa, or both simultaneously, as occasion may require. Our invention, therefore, consists, first, in an arrangement of pipes, in connection with a cheese-vat, that will admit of the steam passing through said pipes being shifted either to the bottom or sides of the vat, substantially as and for the purpose hereinafter set forth; second, in the arrangement, in a cheese-vat, of the steam-pipe at the sides of the vat; third, in the construction and general arrangement of the devices hereinafter set forth.

In order to enable others skilled in the art to which our invention appertains to make and use the same, we will now proceed to describe its construction and operation, referring to the annexed drawing, in which—

Figure 1:
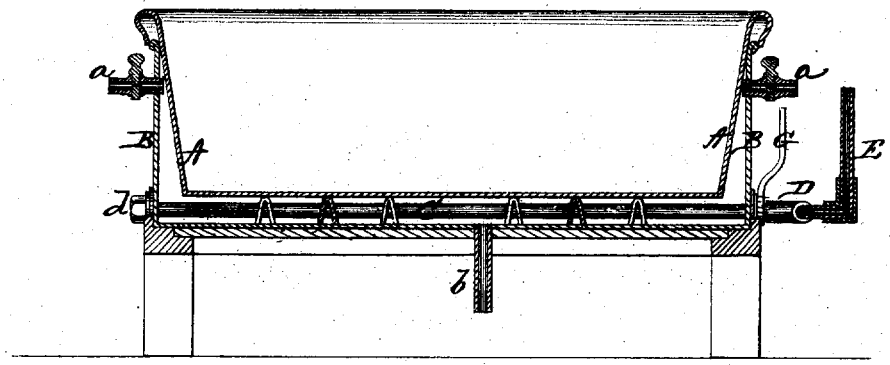
Figure 2:
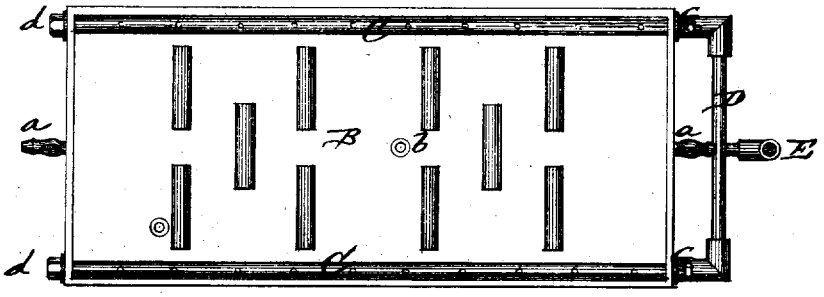

Figure 1 is a longitudinal vertical section of our vat, and Fig. 2 is a plan view of the case.

Our vat consists of a double vat with an air-tight space between the two, at the sides, bottom, and ends, of about one inch. The inside vat A, which we style the "milk-vat," is about the same shape as the vats now in use, and made of tin or tinned iron. The outside vat B, called the "case," is made of tin, zinc, iron, or other suitable material. This case is made about two inches larger on the bottom and about two-thirds as deep, with a faucet, *a*, at each end, near the top, and another, *b*, under the bottom, near the center. The top edge of the case B is drawn in so that it fits close to the sides of the milk-vat A. The top edges of the case are either soldered to the sides of the milk-vat or are allowed to rest on rubber packing in a flange that is soldered to the milk-vat, thus making the space between the vat and case air-tight, preventing the heat from escaping. Two iron pipes, C C, run lengthwise through the case on the bottom, one close to each side, which pipes extend through both ends of the case about two inches in length. On the outside, at one end of the case, the pipes C C are connected by a cross-pipe, D, which cross-pipe is connected with a pipe, E, that leads to the boiler. At the opposite end of the case the pipes C C are closed with screw-plugs *d d*, which can be removed and let the steam pass through to clean the pipes of sediment if any should collect in them. At one end of the case there is a short lever, G, attached to each of the pipes C, for the purpose of turning said pipes. The pipes C C are perforated with a number of small holes, drilled in them in a straight line on one side of each pipe, to let the steam into the space between the vat and case.

If we wish to heat the milk-vat on the sides and not have any heat on the bottom, we turn the pipes C C, by use of the levers G G, so that the steam is thrown from the holes in the pipe up the sides of the vat, opening the faucets *a a* and closing the faucet *b;* or reverse to heat the bottom and not the sides of the vat. If we wish a uniform heat all through the vat, we close all the three faucets in the case.

Having thus fully described our invention, what we claim as new, and desire to secure by Letters Patent, is—

1. The arrangement, in a cheese-vat where steam is used to produce heat, of the steam-pipe at the sides of the vat, substantially for the purpose described.

2. The movable perforated steam-pipes C C, arranged or located on the side or sides of the air-tight space of the double vat A B, whereby the steam may be shifted from the sides to the bottom, and vice versa, substantially as set forth.

3. The case B, provided with faucet *a* at each end and a faucet, *b*, at the bottom, in combination with the milk-vat A, perforated pipes C C with their screw-plugs *d d*, cross-pipe D, connecting-pipe E, and levers G G, all constructed and arranged substantially as and for the purposes herein set forth.

In testimony that we claim the foregoing as our own we affix our signatures in presence of two witnesses.

EZRA H. STUART.
WALTER A. STUART.

Witnesses:
B. E. DAVIS,
F. E. EASTON.